United States Patent [19]
Chihara et al.

[11] Patent Number: 5,278,514
[45] Date of Patent: Jan. 11, 1994

[54] MSK DEMODULATOR USING ONE SYNCHRONOUS DETECTOR

[75] Inventors: Takahiro Chihara, Shiki; Masao Miyazaki, Nara; Tomozo Ohta, Ikoma, all of Japan

[73] Assignee: Sharp Kabushiki Kaisha, Osaka, Japan

[21] Appl. No.: 935,118

[22] Filed: Aug. 27, 1992

[30] Foreign Application Priority Data

Sep. 25, 1991 [JP] Japan ................................ 3-246023

[51] Int. Cl.⁵ .......................................... H04L 27/14
[52] U.S. Cl. .................................. 329/302; 329/303; 375/80; 375/90
[58] Field of Search ............... 329/300, 301, 302, 303; 375/80, 90

[56] References Cited

U.S. PATENT DOCUMENTS

| | | | |
|---|---|---|---|
| 4,647,864 | 3/1987 | Rafferty et al. | 375/78 X |
| 4,878,029 | 10/1989 | Saulnier et al. | 329/341 |
| 5,048,058 | 9/1991 | Kaleh | 329/300 X |
| 5,170,131 | 12/1992 | Takahiro et al. | 329/300 |

FOREIGN PATENT DOCUMENTS 0098649 1/1984 European Pat. Off. .
0118214 9/1984 European Pat. Off. .

OTHER PUBLICATIONS

*IEEE Transactions on Communications*, vol. 31, No. 2, Feb. 1983, New York, pp. 290-295, McLane: "The Viterbi Receiver for Correlative Encoded MSK Signals".

Kameda et al, "A Multi-Channel PCM Sound Receiver For Satellite Broadcasting", IEEE Transactions on Consumer Electronics, vol. 37, No. 3, Aug. 1991, pp. 723-730.

*Primary Examiner*—Siegfried H. Grimm
*Attorney, Agent, or Firm*—Nixon & Vanderhye

[57] ABSTRACT

An MSK signal demodulating circuit including a carrier reproducing circuit for reproducing a carrier phase-synchronized with a component of a mark frequency or a space frequency of an MSK signal, a detector for performing synchronous detection of the MSK signal by means of the reproduced carrier, an identification circuit for converting an analog output from this detector into serial digital data, and a serial-parallel conversion circuit for converting the serial digital data into I, Q parallel data.

3 Claims, 4 Drawing Sheets

MSK DEMODULATOR USING ONE SYNCHRONOUS DETECTOR

BACKGROUND OF THE INVENTION

1. Field of the Invention

The present invention relates to an MSK signal demodulating circuit for demodulating an MSK (Minimum Shift Keying) signal.

2. Description of the Related Art

One of the digital modulation systems recently adopted in radiocommunication is MSK modulation system which means a continued phase FSK (Frequency Shift Keying) system having a modulation index of 0.5, transmitting a mark frequency (fm) and a space frequency (fs) in response to transmission data 1, 0. The MSK modulation system has an advantage of resisting non-linear distortion because of constant amplitude in modulation carrier. A conventional method for demodulating an MSK signal typically involves orthogonal synchronous detection by reproducing a carrier synchronized in phase with a carrier f0 at the sending end.

FIG. 4 is a block diagram showing a conventional MSK signal demodulating circuit by means of such method. In this drawing, an MSK signal inputted to an input terminal 10 is subject to orthogonal synchronous detection by detectors 12 and 13 on the basis of an output signal of a carrier reproducing circuit 21, which reproduces a carrier phase-synchronized with carrier f0 at the sending end, and of another signal which is 90° phase-shifted from the said signal by 90° phase shifter 14. Then, the bands of the detected analog signals are limited by low-pass filters 15 and 16 respectively, followed by conversion of the respective analog signals into digital ones by identification circuits 17 and 18. While the clock reproduced by a clock reproducing circuit 30 is subject to ½ frequency demultiplication by a ½ divider 31 to use it as a timing pulse for the identification circuits 17 and 18 in which A/D converters are used in general.

Such a demodulation system is called a parallel demodulation system in view of the separate detections for a common component (axis I) and an orthogonal component (axis Q). Data I and Q converted into digital signals are inputted to an error correcting circuit 40 for error correction, and then outputted from an output terminal 50. Error correction codes are used in general to assure high quality of transmission performance, while the error correcting circuit 40 is often provided as an LSI. For example, in case of using a convolutional code as an error correction code, the error correcting circuit 40 is provided as Viterbi decoding LSI which receives data I and Q.

The above MSK demodulation system is on a parallel demodulation basis, requiring an identification circuit, each for axis I and axis Q, while such a type of circuit is expensive in general, resulting in higher costs.

On the other hand, in using an A/D converter for an identification circuit, an AGC (automatic gain control) amplifier is often installed at the front of the A/D converter in order to prevent the error rate from being degraded by variation in input level of the A/D converter, while an AGC amplifier is needed each for axis I and axis Q also in this case, complicating the construction and resulting in higher costs again.

Moreover, to make a dual system, the identification circuits of axis I and axis Q are required to have the same identification performance, while it is actually pretty difficult to mass-produce such circuits working stably over the whole range of operating temperature.

SUMMARY OF THE INVENTION

Therefore, the object of the present invention is to offer an MSK signal demodulating circuit enabling a more simple construction, lower cost and stable working.

To effect the above object, the MSK signal demodulating circuit of the present invention comprises a carrier reproducing circuit for reproducing a carrier phase-synchronized with a component of a mark frequency or a space frequency of a received MSK signal, a detector for performing synchronous detection of said MSK signal by means of a reproduced carrier, an identification circuit for converting an analog output of said detector into serial digital data, and a serial-parallel conversion circuit for dividing said serial digital data into odd and even bits in order to obtain parallel digital data.

According to the present invention, it is possible to manage with a single system of identification circuit to convert the analog output of a detector into digital data, permitting use of a single system of AGC amplifier, if used, very effectively resulting in simplification, lower cost and higher stability of the circuit.

Further objects and advantages of the present invention will be apparent from the following description of the preferred embodiment of the invention as illustrated in the accompanying drawings.

DESCRIPTION OF THE PREFERRED EMBODIMENT

Figure 1:
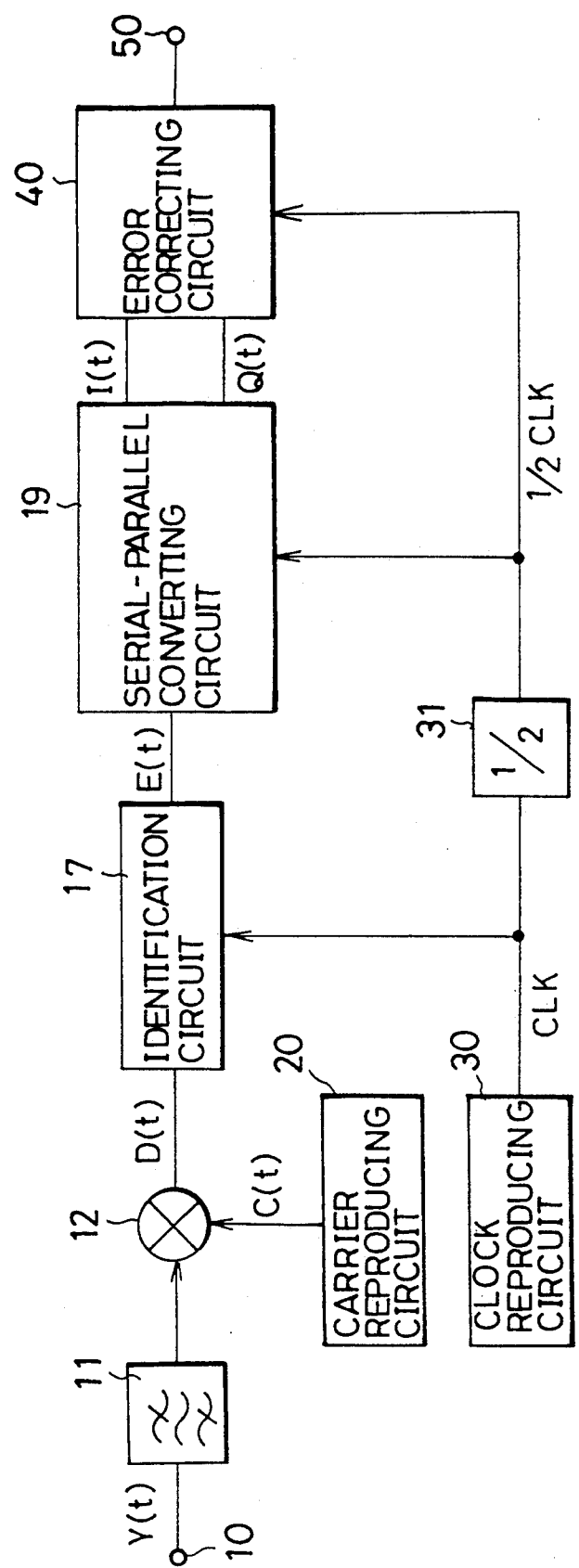
FIG. 1 is a block diagram of an embodiment of an MSK signal demodulation circuit of the present invention.

FIG. 1 shows an embodiment of the present invention. In the drawing, reference numeral 10 denotes an input terminal, 11 denotes a band pass filter, 20 denotes a carrier reproducing circuit for reproducing a carrier phase-synchronized with a component of mark frequency fm or space frequency fs of an MSK signal, 12 denotes a detector to effect synchronous detection of an MSK signal outputted through the band pass filter 11 by means of a carrier reproduced by the carrier reproducing circuit 20, 17 denotes an identification circuit which converts an analog output outputted from the detector 12 into a digital signal using a clock reproduced by a clock reproducing circuit 30, as a timing pulse, 19 denotes a serial-parallel converting circuit which converts serial data, outputted from the identification circuit 17 using a clock divided into ½ by a ½ divider 31, into I, Q parallel data, and 50 denotes an output terminal.

Now, it will be explained how the above MSK signal demodulation circuit operates. In the above conventional MSK signal demodulation circuit, a carrier phase-synchronized with the carrier f0 at the sending end is reproduced to effect synchronous detection, while this embodiment effects synchronous detection by means of a carrier component of the mark frequency fm or the space frequency fs extracted from the MSK signal.

The band of the MSK signal inputted to the input terminal 10 is limited by the band pass filter 11 to be subjected to synchronous detection by the detector 12 by means of an output signal from the carrier reproducing circuit 20. The output of the detector 12 is converted from an analog signal into a digital signal by the identification circuit 17. Serial data outputted from the identification circuit 17 is converted into I, Q parallel data by the serial-parallel converting circuit 19 to be inputted to the error correcting circuit 40 where errors in data are corrected to output correct data from the output terminal 50.

Then, it will be explained in a little more detail. In general, the MSK signal Y(t) is represented in the following:

$$Y(t) = \cos\{(\omega_0 + u_i \cdot \omega_d)t + \phi_0\} \quad (1)$$

where $\omega_o$ denotes a carrier angular frequency, $\omega_d$ denotes ¼ frequency of a clock angular frequency, ui denotes digital values of −1 or +1 respectively corresponding to send data of 0 and 1, and $\phi 0$ denotes an initial phase (0 or $\pi$).

Now, $\phi 0$ is assumed hereinafter to be 0, since the generality is not affected even assuming so. Then, synchronous detection using an extracted carrier component of mark frequency fm (fm = f0 + fd) is supposed hereinafter, while the same result is obtained from synchronous detection using an extracted carrier component of space frequency fs (fs = f0 − fd).

Now, assuming the phase error to be 0, the signal reproduced by the carrier reproducing circuit 20 is represented as follows:

$$C(t) = \cos(\omega_m t) = \cos(\omega_0 + \omega_d)t \quad (2)$$

Therefore, when the MSK signal represented by the above formula (1) is subjected to synchronous detection by means of the signal represented by the above formula (2), the following output signal D(t) of the detector 12 is obtained:

$$D(t) = (\tfrac{1}{2})\cos\{(u_i - 1)\cdot \omega_d t\} \quad (3)$$

Consequently, in case of send data = 1 i.e. ui = +1, $$D(t) = \tfrac{1}{2} \quad (4)$$

While, in case of send data'st0 i.e. ui = −1, $$D(t) = (\tfrac{1}{2})\cos(2\omega_d t) \quad (5)$$

Figure 3:
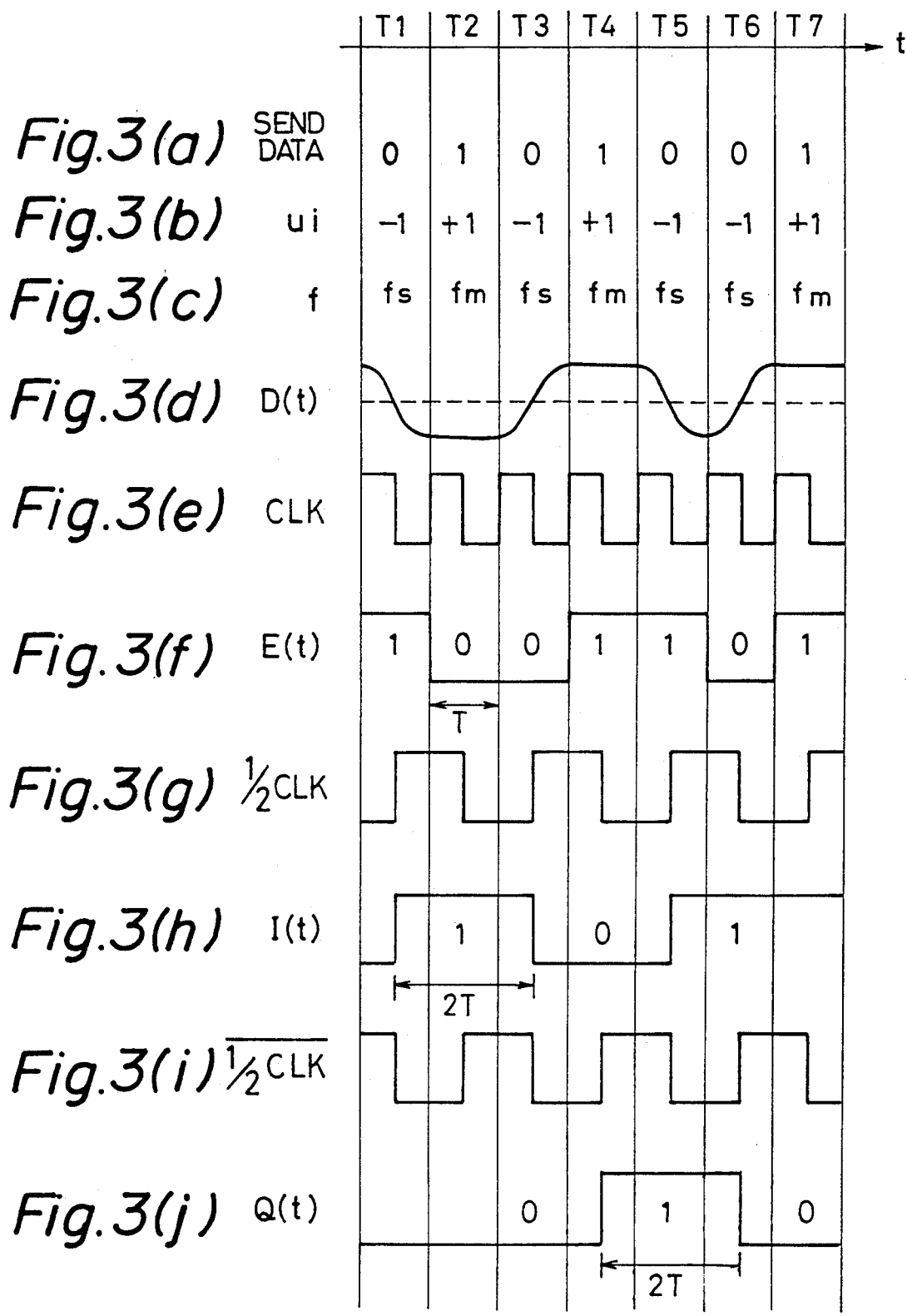
FIGS. 3a to 3j are diagrams showing waveforms of the respective parts to explain the operation of the circuit shown in FIG. 1.
Figure 4:
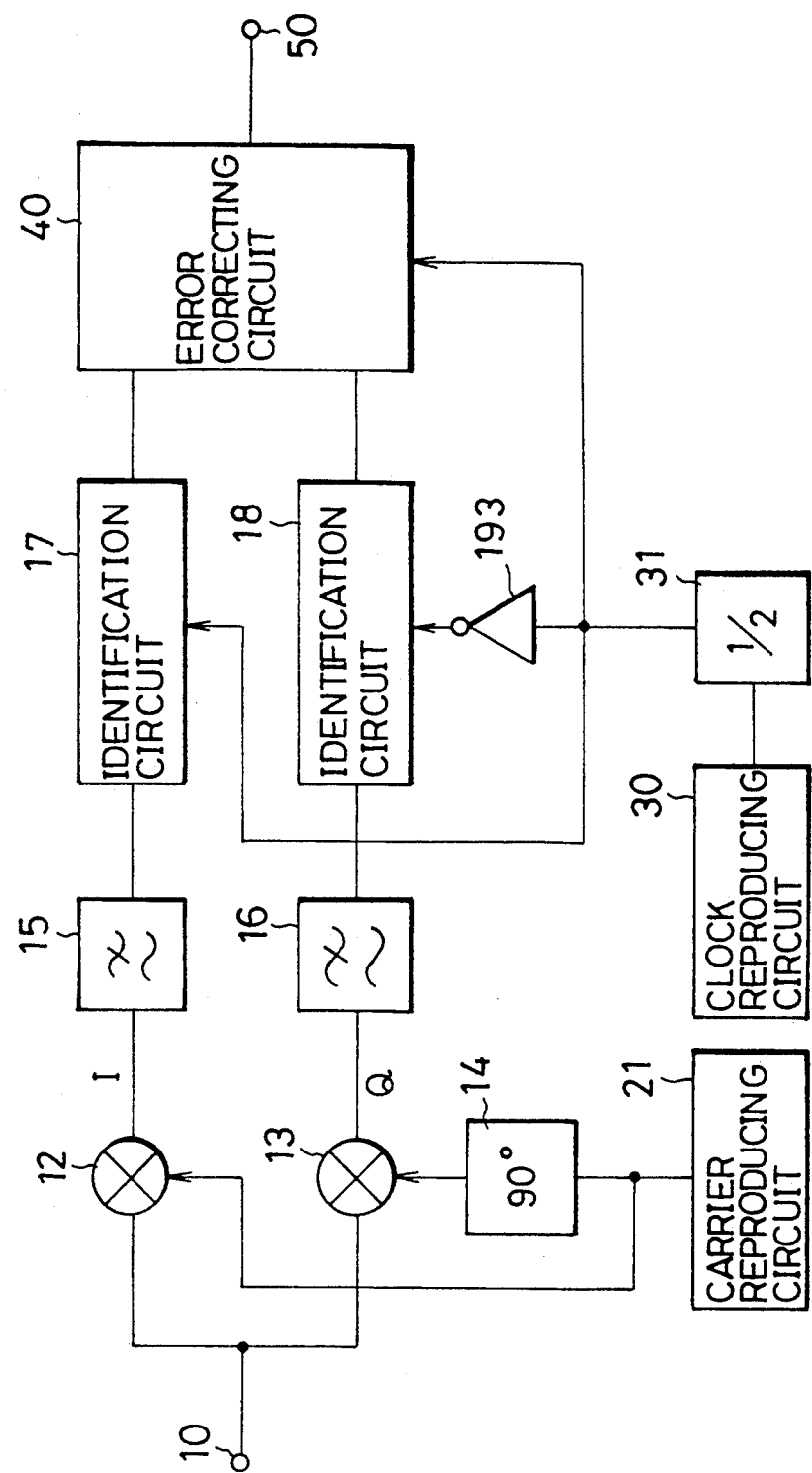
FIG. 4 is a block diagram of a conventional MSK signal demodulating circuit.

FIG. 3 shows the waveforms of the respective parts of FIG. 1, by way of example, in case of send data "0101001". The value of ui corresponding to send data as shown in FIG. 3(a) is as shown in FIG. 3(b), resulting in variation of the MSK signal frequency, as shown in FIG. 3(c), in accordance with such values.

Therefore, the output signal D(t) of the detector 12 is as shown in FIG. 3(d), resulting from the above formulas (4) and (5). In other words, the output signal D(t) is a certain D.C. signal during periods T2, T4 and T7 where send data = 1 i.e. the MSK signal shows a mark frequency fm, while it is an A.C. signal during periods T1, T3, T5 and T6 where send data = 0 i.e. the MSK signal shows a space frequency fs. By the way, each of periods T1 to T7 has a length equivalent to one cycle of the clock. Therefore, the output signal D(t) of the detector 12 is one-half the clock frequency in any of periods T1, T3, T5 and T6.

The output signal D(t) of the detector 12 is identified by the identification circuit 17, using a clock CLK as a timing pulse as shown in FIG. 3(e), which is reproduced by the clock reproducing circuit 30, resulting in a digital signal E(t) as shown in FIG. 3(f). Then, this digital signal E(t) is separated into parallel data I(t) and Q(t) by the serial-parallel converting circuit 19 which comprises D flip-flops 191 and 192 as shown in FIG. 2.

Figure 2:
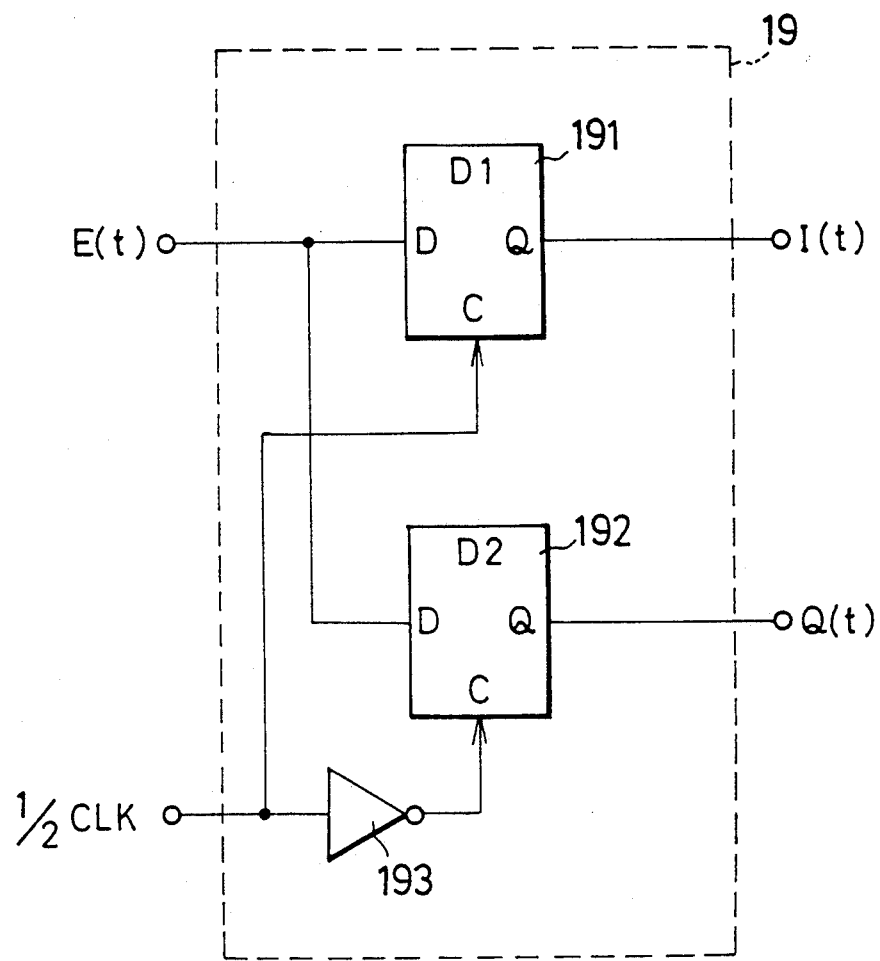
FIG. 2 is a circuit diagram showing a concrete example of a serial-parallel conversion circuit shown in FIG. 1.

In other words, the output signal ½CLK of the ½ divider 31 as shown in FIG. 3(g) is used to latch the output signal E(t) of the identification circuit 17 by means of the D flip-flop 191, as shown in FIG. 2, in order to obtain data I(t) as shown in FIG. 3(h). On the other hand, a reverse signal of the output signal ½CLK of the ½ divider 31, as shown in FIG. 3(i), outputted from the inverter 193, is used to latch the output signal E(t) of the identification circuit 17 by means of the D flip-flop 192, as shown in FIG. 2, in order to obtain data Q(t) as shown in FIG. 3(j). In the above serial-parallel conversion, the demodulated serial data E(t) is divided into odd and even bits, that is, into parallel data I(t) and Q(t).

Such serial-parallel conversion makes the period of the parallel data I(t) and Q(t) twice that of the original serial data E(t), as a matter of course. In addition, the parallel data I(t) and Q(t) here out of phase with each other by 90° can be made in phase by latching both of them with the same clock by means of other D flip-flops before inputting them to the error correcting circuit 40 if required.

Many widely different embodiments of the present invention may be constructed without departing from the spirit and scope of the present invention. It should be understood that the present invention is not limited to the specific embodiment described in the specification, except as defined in the appended claims.

What is claimed is:

1. An MSK signal demodulating circuit comprising:
   a carrier reproducing circuit for reproducing a carrier phase-synchronized with a component of a mark frequency or a space frequency of a received MSK signal;
   a detector for performing synchronous detection of said MSK signal by means of said reproduced carrier;
   an identification circuit for converting an analog output of said detector into serial digital data; and
   a serial-parallel conversion circuit for dividing said serial digital data into odd and even bits in order to obtain parallel digital data.

2. An MSK signal demodulating circuit according to claim 1, wherein said serial-parallel conversion circuit comprises first and second D flip-flops, data terminals of said first and second D flip-flops receiving said serial digital data issued from said identification circuit, a clock terminal of said first D flip-flop receiving a reproduced clock which has been frequency-divided by half, a clock terminal of said second D flip-flop receiving said reproduced clock through an inverter.

3. An MSK signal demodulating circuit according to claim 1, wherein an error-correcting circuit is connected to an output of said serial-parallel conversion circuit.

* * * * *